Sept. 9, 1930.  A. F. CALLISON  1,775,552
MERCHANDISE CONTAINER UNDERFRAME MEMBER FOR VEHICLES
Filed Feb. 18, 1928   2 Sheets-Sheet 1
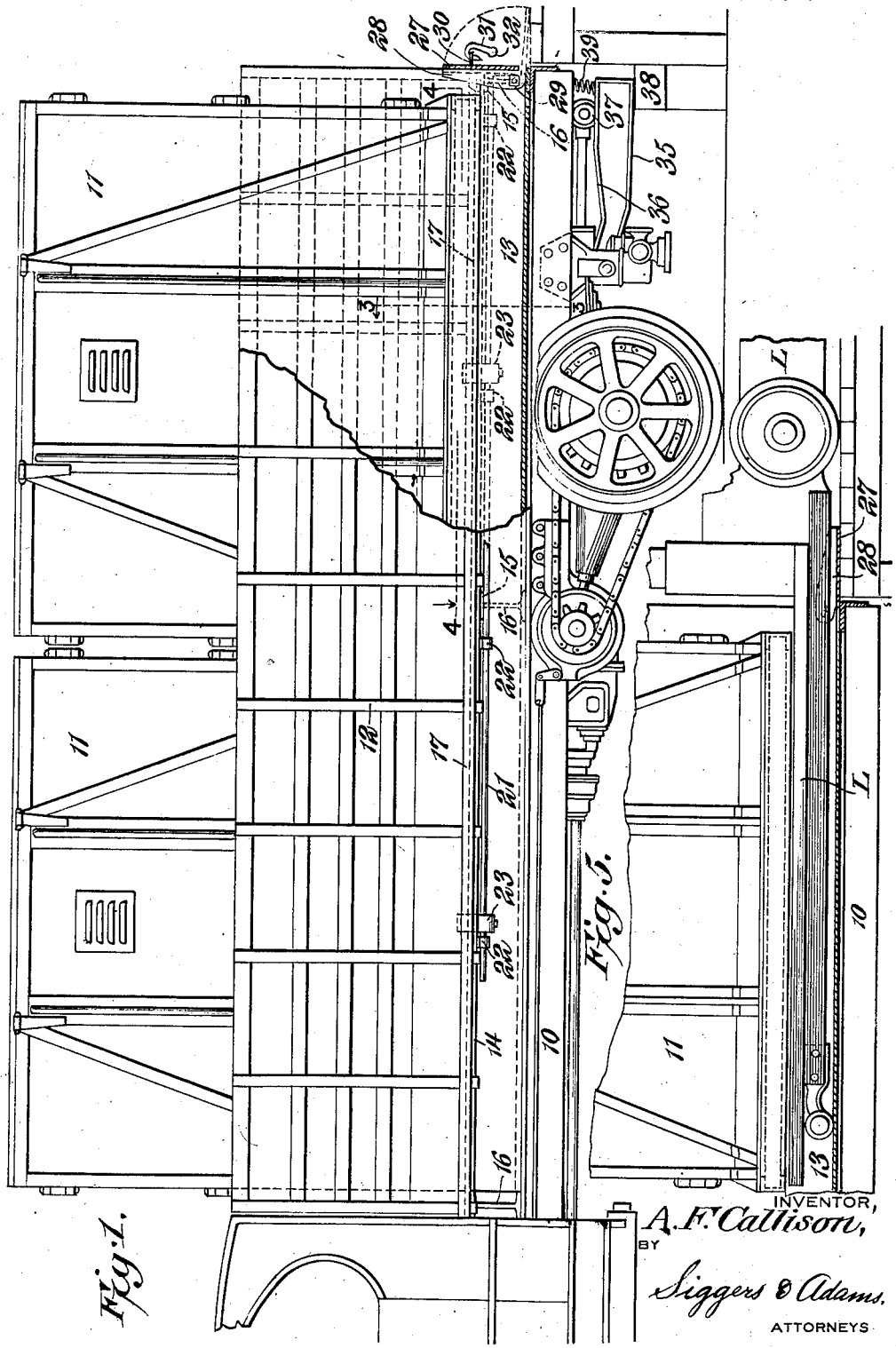
INVENTOR,
A. F. Callison,
BY
Siggers & Adams.
ATTORNEYS Sept. 9, 1930.                A. F. CALLISON                1,775,552
           MERCHANDISE CONTAINER UNDERFRAME MEMBER FOR VEHICLES
                    Filed Feb. 18, 1928         2 Sheets-Sheet 2
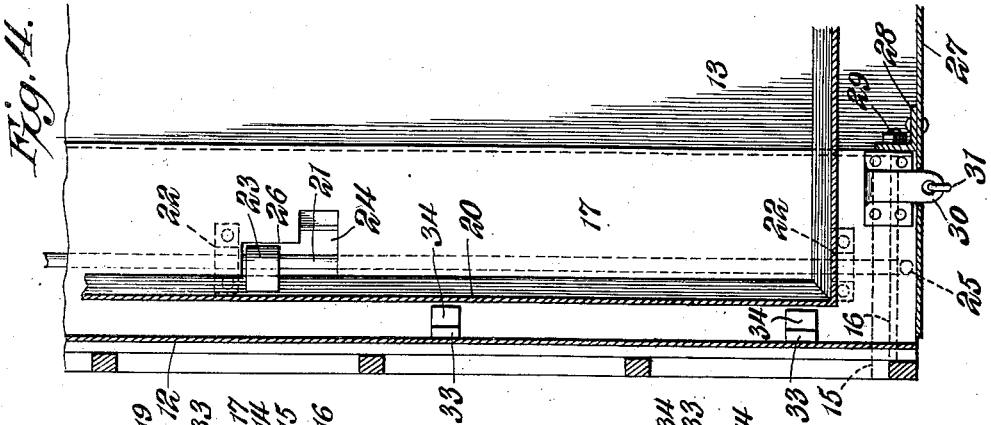
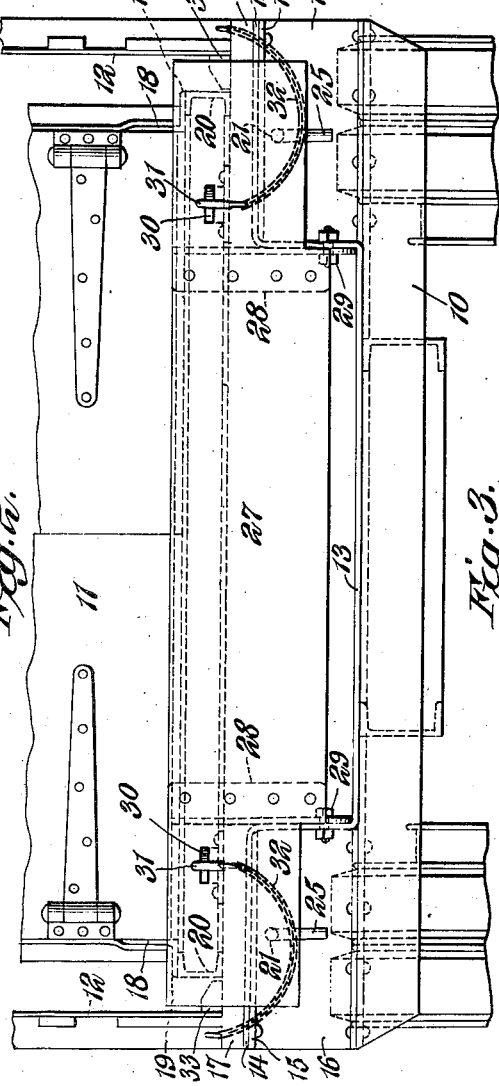
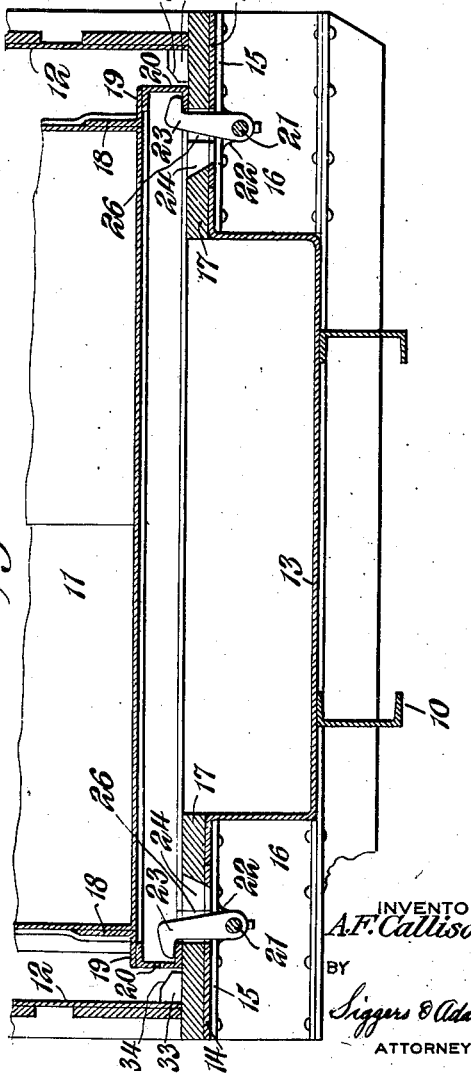
INVENTOR,
A. F. Callison
BY
Siggers & Adams,
ATTORNEYS Patented Sept. 9, 1930

1,775,552

UNITED STATES PATENT OFFICE

ABNER F. CALLISON, OF BRONX, NEW YORK

MERCHANDISE-CONTAINER UNDERFRAME MEMBER FOR VEHICLES

Application filed February 18, 1928. Serial No. 255,465.

This invention relates to apparatus for handling merchandise containers and aims, among other objects, to provide means associated with a vehicle to support a container or a series of containers thereon in such position that they may be removed from or loaded on the vehicle by means of a lift truck. Further, the invention contemplates the provision of locking means, associated with the vehicle cooperating with the containers to hold them in place while they are in transit.

Referring to the drawings:

Fig. 1 is a side elevation, partly in section, of a motor vehicle embodying the invention;

Fig. 2 is a fragmentary rear-end elevation of the motor vehicle shown in Fig. 1;

Fig. 3 is a sectional view taken on the line 3—3 of Fig. 1;

Fig. 4 is a fragmentary sectional view taken on the line 4—4 of Fig. 1; and

Fig. 5 is a fragmentary elevation, partly in section, showing a lift truck in outline, ready to be applied to a container on the vehicle.

The loss of time entailed by loading and unloading merchandise containers carried by vehicles such as large motor trucks has become a very serious problem. When large trucks, for example, are employed in transferring loads from place to place, either to be stored or reloaded, much time and labor have to be expended in loading and unloading especially where there are no facilities for handling containers by overhead cranes and the like. The loss of time entailed in such operations on a single truck frequently delays a large fleet of trucks at a station, thus, involving considerable expense. This invention aims to provide means associated with a vehicle and the containers to expedite the loading and unloading operation whereby the time lost may be reduced to a minimum.

This description will be confined to an illustrative embodiment of the invention as applied to motor vehicles, it being understood, however, that the idea is capable of embodiment in other vehicles.

Referring to Fig. 1, there is shown a motor truck 10 of conventional design in so far as the chassis is concerned. Supported on the chassis, there is shown a novel underframe member constituting a platform having upstanding portions on which are adapted to be loaded a series of merchandise containers 11, so that they may be loaded thereon and unloaded therefrom at the rear end; although provision may be made for supporting them and unloading them at either side. Also, the body is shown as having removable side frames 12 which may be of conventional design.

To enable the containers to be loaded on and removed from the vehicle by means of ordinary industrial lift trucks L (Fig. 5) there is shown a runway 13, which, in the present instance, is a depressed portion of the vehicle platform. This runway is arranged below the containers 11, and is sufficiently wide to permit a lift truck to be driven under them to elevate them above the supports or underframe members at the opposite sides.

Referring to Figs. 2 and 3 of the drawings, the truck platform is shown as being composed of sheet metal bent U-shaped to provide the runway and having horizontal portions or flanges 14 on opposite sides secured to the top flanges 15 of structural beams 16 which are also secured to the chassis frame at its opposite sides. On the horizontal flanges there are shown side sill plates 17 to make them more rigid and in which the stake pockets are provided for the side frames 12.

Herein, the containers are shown as being of more or less conventional design with the exception that they are provided with structural steel bases composed of angles 18 presenting horizontal flanges 19 around the lower peripheral edges and channel beams 20 suitably secured to the lower faces of the flanges. The arrangement is such that the channel beams have their flanges extending inwardly and the lower flanges are adapted to rest on the sill plates 17.

It is desirable to make provision for holding down a series of containers loaded on the vehicle and prevent them from being jarred out of position while they are in transit. To this end, referring to Figures 3 and 4, there is shown on each side of the runway a longitudinal rocker bar or rod 21 journalled below the horizontal flanges 14 of the platform so that it can rock and slide in suitable bearing members 22 secured thereto (see Fig. 1). At suitable intervals on the rocker bar or rod, there are secured latch dogs 23, extending upwardly through openings 24 in the flange 14 and the plate 17, said openings being so shaped that the dogs may be swung inwardly out of engagement with the lower flange of the channel members 20. At the rear end of the vehicle or at any convenient location, there is arranged an operating handle 25 for rocking the bar and simultaneously manipulating all of the dogs.

To lock the latch dogs in holding position on the flanges of the container base members, provision is made for shifting the bars or rods 21 longitudinally in their bearings so that the arms of the dogs are shifted into longitudinal branch openings 26 in the flanges 14 and sill plates 17 (see Fig. 4). That is to say, each of the openings for the latch dogs is substantially L-shaped. When the dogs are thus shifted, they cannot be disengaged from the flanges of the channels 20.

To provide an extension platform over which industrial trucks may be driven on and off the runway 13, there is shown a pivoted tail gate 27 preferably made of sheet metal and having structural angles 28 presenting flanges through which the pivot bolts 29 may be secured to the side walls of the runway. Herein, the arrangement is such that, when the tail gate is swung down, it forms a continuation of the runway to a platform. The end portions of the tail gate may be and preferably are somewhat narrower than that portion which covers the end of the runway, and on opposite sides, it is shown as having openings to receive locking eyes 30 projecting from the underframe members, into which suitable hooks 31 carried on chains 32 may be inserted (see Figure 2).

To prevent rearward longitudinal movement of the rocker bars or rods 21, the tail gate is adapted to engage their rear ends when it is closed. Thus, the dogs cannot be disengaged from the side edges of the branch openings 24. Furthermore, the tail gate cannot be closed without first locking the containers because the dogs must be pushed into the branch openings 26.

It is desirable to provide some means to prevent the containers from being shifted in transit against the dogs when the vehicle is jolted. To this end a plurality of guide blocks 33 having downwardly and inwardly inclined or bevelled faces 34 are secured to the underframe members (see Fig. 3). When the containers are being lowered by the lift truck, the bevelled faces will guide them so that their flanged bases will be seated properly to be locked down by the dogs. Moreover, the blocks have vertical faces below the bevelled portions to prevent the containers from being jolted too far out of place. This arrangement is particularly desirable on vehicles which have no side frames.

It is desirable to provide for lifting the rear end of a motor vehicle platform to the level of a platform on which containers are to be transferred, ordinarily a stationary platform will be high enough to come even with the vehicle platform when it is empty and the springs and tires are not deflected. To this end any type of jack may be applied to the chassis.

In Fig. 1 of the drawing there is shown a lifting device including a pivoted member 35 having an upper inclined surface 36 between which and the vehicle frame a reciprocating roller 37 is adapted to be operated. The lifting roller is preferably actuated by means of the well known hydraulic mechanism not shown. The arrangement is such that the pivoted member 35 is adapted to be supported on a ledge 38 below the level of a platform and then the roller 37 is projected to the position shown, thereby lifting the rear end of the truck platform to a level with the loading platform. The pivoted member is preferably held up by means of a spring 39 when the roller is retracted. The spring and tire deflection of a vehicle do not usually exceed three inches, depending upon the strength of the springs and the load. Hence, the maximum lift does not need to be more than a few inches.

To load the containers on vehicles such as that described it is only necessary to lower the tail gate to a platform or support and drive an industrial truck carrying a container along the runway, until it is in proper position, and then lower it so that it is properly seated as described. The hoisting device will be extended, as shown in Fig. 1, to hold the rear end of the vehicle platform at the same level until it is loaded. After the containers are placed on the upstanding supports or frame members, they may easily be locked in place and the tail gate may be closed. To unload the containers, the lift truck is driven on the runway so that its platform underlies the base of one or more containers; then the platform is elevated to lift them clear of their seats so that they may be carried off. Thus, the loading and unloading operations can be done mechanically without employing expensive crane equipment and the time for performing these operations is reduced to a minimum.

From the foregoing description, it will be understood that apparatus such as that described may be easily and economically applied to any vehicle platform or chassis. Moreover, the equipment may be varied very widely without departing from the spirit of the invention. It is not indispensable that the containers shall be loaded endwise of the vehicle. The side frames may be removed and the containers may be placed crosswise of the platform. Moreover, the side supporting frames or members adjacent to the runway may be built of any suitable material. Furthermore, the containers may be so shaped as to be loaded either transversely or longitudinally of the vehicle platform and any number of runways may be provided.

Obviously, the present invention is not restricted to the particular embodiment thereof herein shown and described. Moreover, it is not indispensable that all the features of the invention be used conjointly, since they may be employed advantageously in various combinations and sub-combinations.

What is claimed is:

1. An apparatus of the character described, comprising, in combination, a vehicle having a platform; spaced upstanding supports on the platform; a container adapted to rest upon the supports; a depressed longitudinal runway for a lift truck under the container whereby the lift truck may engage the container and lift it from its seats on said supports; and means to raise the rear end of the platform so that the runway is substantially flush with a loading platform.

2. An apparatus of the character described, comprising, in combination, a motor truck having a platform mounted thereon; container supporting members mounted upon the platform; a depressed longitudinal runway for a lift truck in the platform arranged between the container supporting members; a container adapted to rest upon said container supporting members; and lifting means on the truck to raise the runway substantially to a level with a loading platform.

3. An apparatus of the character described, comprising, in combination, a vehicle having a depressed runway; a lift truck adapted to be rolled on the runway; container supports arranged on opposite sides of the runway; a merchandise container adapted to rest on the container supports and having a flanged base; and locking means on the vehicle extending upwardly through said supports between the flanges on said base and adapted to engage them to hold the container seated.

4. An apparatus of the character described, comprising, in combination, a motor vehicle chassis having a supporting platform thereon; upstanding underframe members associated with the platform; a merchandise container supported on the upstanding underframe members; rocker shafts on the vehicle; hooks carried by the rocker shafts; means whereby the rocker shafts may be actuated; means on the merchandise container engageable by said hooks; a gate pivotally mounted on the ends of the underframe members; and means for locking the gate in closed position; said gate cooperating with said rocker shafts to maintain the hooks in locked position.

5. An apparatus of the character described, comprising, in combination, a motor vehicle chassis having a supporting platform thereon; upstanding underframe members associated with the platform; a merchandise container supported on the upstanding underframe members; rocker shafts on the vehicle; hooks carried by the rocker shafts; handles at the rear end of the platform to manipulate the rocker shafts; means on the container engageable by said hooks; said shafts and hooks being movable longitudinally to lock the hooks on the container; and a tail gate acting as a stop for said rocker shafts when it is closed to prevent unlocking movement thereof.

6. A vehicle, having upstanding load supports; a lift truck runway between the supports; a merchandise container seated on said supports and arranged to be lifted by the platform of the lift truck; means to lock the container on the supports; a pivoted tail gate adapted to be swung down and form a continuation of said runway so that the lift truck may be driven on and off the vehicle; and means to lift and support the runway substantially on a level with a loading platform.

7. A vehicle having a platform; upstanding load supporting portions at opposite sides of the platform; a lift truck runway between said supporting members; a merchandise container seated on said supporting members; a tail gate at the rear end of said platform adapted to be swung open to form a continuation of the said runway whereby a lift truck may be rolled on and off the platform; and a lifting jack on the vehicle to raise and to support the runway substantially on a level with a loading platform.

8. In combination with a vehicle having a platform adapted to support merchandise containers; a lift truck runway associated with the platform whereby a lift truck may be driven along the runway under the containers; means to lock the containers on the platform; a pivoted tail gate adapted to be swung down to form a continuation of the runway, said tail gate cooperating with said locking means to prevent accidental disengagement thereof.

9. A vehicle having a platform presenting upstanding supports on opposite sides; a lift truck runway between the supports; a container seated on the supports so that the lift truck may be driven under it; flanged bases on the container; rockable locking members on the vehicle adapted to engage said flanged members; said platform having L-shaped openings for said locking members; and means for shifting said locking members in branches of said openings to hold them in locked position.

10. In combination with a vehicle having a platform adapted to support merchandise containers; a longitudinal lift truck runway associated with the platform whereby a lift truck may be driven along the runway under the containers; means to lock the containers on the platform; and spaced guiding blocks on opposite sides of the platform having faces to guide the containers both laterally and longitudinally so that they will be seated properly to be locked thereon, said guiding means also constituting side bumpers for the containers.

11. In combination with a vehicle having a platform adapted to support merchandise containers; a lift truck runway associated with the platform whereby a lift truck may be driven along the runway under the containers; and spaced guiding blocks secured to the opposite sides of the platform and having beveled faces to guide the containers so that they will be seated properly on the platform, said blocks also presenting side faces providing side bumpers for the containers.

12. In a motor truck, a load supporting platform on the chassis frame for carrying merchandise containers; a lift truck runway on the platform extending longitudinally thereof; and lifting means at the rear end of the vehicle below the platform to level the runway with a freight-receiving platform.

In testimony, that I claim the foregoing as my own, I have hereto affixed my signature.

ABNER F. CALLISON.